US006978926B2

(12) United States Patent
Kobayashi et al.

(10) Patent No.: US 6,978,926 B2
(45) Date of Patent: Dec. 27, 2005

(54) CIRCULATING TYPE BANK NOTE DEPOSITING AND DISPENSING MACHINE

(75) Inventors: Toshihiko Kobayashi, Hyogo (JP); Hitoshi Kobayashi, Himeji (JP); Manabu Yamada, Himeji (JP); Tsuguo Mizoro, Hyogo (JP); Shigeki Nakatsuka, Hyogo (JP)

(73) Assignee: Glory Ltd., Hyogo (JP)

( * ) Notice: Subject to any disclaimer, the term of this patent is extended or adjusted under 35 U.S.C. 154(b) by 130 days.

(21) Appl. No.: 10/690,830

(22) Filed: Oct. 23, 2003

(65) Prior Publication Data

US 2004/0134839 A1 Jul. 15, 2004

(30) Foreign Application Priority Data

Oct. 24, 2002 (JP) ............................ 2002-309210

(51) Int. Cl.[7] ............................................ G06F 17/60
(52) U.S. Cl. .......................... 235/379; 902/12; 902/13; 902/14
(58) Field of Search ........................... 235/379; 902/8, 902/9, 12, 13, 14; 705/43

(56) References Cited

U.S. PATENT DOCUMENTS 4,744,468 A * 5/1988 Goi et al. .................. 209/534

* cited by examiner

*Primary Examiner*—Karl D. Frech
(74) *Attorney, Agent, or Firm*—Morrison & Foerster LLP

(57) ABSTRACT

The invention provides a circulating type bank note depositing and dispensing machine with which the progress of depositing and dispensing is made visible from a customer side, speeding up the temporary storage of deposited bank notes and facilitating the return of the temporarily stored bank notes if the deposit is not approved. The bank note depositing and dispensing ports are disposed on the upper side of the machine body, making it possible for a customer to observe or check the progress of a deposit or dispensing. Temporarily stored deposited bank notes are disposed in the front side area of the machine body, and if the deposit is not approved, the front side door of the temporary storage portion opens to allow the temporarily stored bank notes to be taken out from the front side of the machine body, facilitating the quick return of the temporarily stored bank notes.

8 Claims, 7 Drawing Sheets

CIRCULATING TYPE BANK NOTE DEPOSITING AND DISPENSING MACHINE

BACKGROUND OF THE INVENTION

1. Field of the Invention

The present invention relates to a circulating type bank note depositing and dispensing machine by which deposited bank notes are used as bank notes to be dispensed.

2. Related Background Art

Conventionally, there is a circulating type bank note depositing and dispensing machine that is disposed on the counter of a financial institution such as a bank, etc., and is commonly used as two tellers who are inside the counter, that is, a circulating type bank note depositing and dispensing machine that can be used by tellers existing at either side or both sides of the left and right sides of the circulating type bank note depositing and dispensing machine.

In such a circulating type bank note depositing and dispensing machine, an upper structure unit, an intermediate structure unit and a lower structure unit are disposed on the upper section, intermediate section and lower section of the machine body, respectively. (For example, see Patent Document No. 1).

A bank note depositing port, a bank note dispensing port and a bank note identifying and conveying passage, which is connected to the bank note depositing port and bank note dispensing port, conveys bank notes sheet by sheet, and identifies the bank notes, are provided in the upper structure unit. The bank note depositing port and bank note dispensing port are disposed, so as to be faced forward, at the upper position at the front side of the upper structure unit that is the operation side of the machine which is operated by tellers.

Denominated bank note storage portions which are arrayed in the forward and backward direction of the machine body, respective bank note paying-out portions which are provided downward of the respective denominated bank note storage portions, and a conveying portion for the lower structure unit, which receives bank notes paid out downward from the respective bank note paying-out portions and conveys the same forward and conveys the same upward at the front side area, are, respectively, provided in the lower structure unit. The lower structure unit is drawn out frontward of the machine body, and the respective denominated bank note storage portions are opened when the lower structure unit is drawn out.

A bank note classifying passage having classification portions, and respective temporary storage portions of denominated bank notes are, respectively, provided in the intermediate structure unit. The bank note classifying passage for denominating and classifying bank notes is connected to the bank note identifying passage of the upper structure unit, conveys the bank notes from rearward of the machine body toward the front side thereof, and denominates or classifies the conveying bank notes, and the respective temporary storage portions of denominated bank notes are provided downward of the respective classification portions of the classifying passage.

And, when processing to deposit, bank notes which are received by a customer are inputted into the bank note depositing port, and are temporarily stored in the temporary storage portion of denominated bank notes. And, approval or non-approval of the depositing is confirmed.

When the depositing is approved, respective bottom plates of the temporary storage portions of respective denominated bank notes are opened, and the bank notes are received from the upper inlet opening of the denominated bank note storage portions of the lower structure unit into the denominated bank note storage portions.

Also, when the depositing is not approved, the intermediate structure unit is drawn out to the maximum to the front side of the machine body, all the temporary storage portions of denominated bank notes in the intermediate structure unit are exposed, temporarily stored bank notes of the respective denominated bank notes are taken out in order from the temporary storage portions of denominated banknotes, and are collectively returned to the customer.

Patent Document No. 1

Japanese Unexamined Patent Publication No. Sho-61-141091 (Pages 3 through 5, and FIG. 2)

SUMMARY OF THE INVENTION

However, a customer who requests a depositing process or a dispensing process stands outside the counter, that is, stands at the rear side which is opposite to the front side being the operation side operated by a teller standing inside the counter in a circulating type bank note depositing and dispensing machine disposed inside the counter, and waits for completion of the depositing process or dispensing process carried out by the teller.

Therefore, in a prior art circulating type bank note depositing and dispensing machine, there is a problem of making a customer feel uneasy in that the customer who waits for completion of a depositing process or a dispensing process carried out by a teller is not able to know whether or not the depositing process or dispensing process requested by the customer is processing well.

Further, where a customer requests non-approval of the depositing after the bank notes are temporarily stored, the teller is required to carry out work drawing out to the maximum the intermediate structure unit to the front side, exposing all the temporary storage portions of respective denominated bank notes on the intermediate structure unit, taking out temporarily stored denominated bank notes in order from the temporary storage portions of respective denominated bank notes and collecting the same, wherein there is a problem in that it takes much time for a teller to return the temporarily stored bank notes for which the depositing is not approved and it is troublesome for the teller to return the same to the customer.

In particular, concerning the problem of making a customer feel uneasy in view of the customer not being informed of whether or not the depositing process of the dispensing process requested by the above-described customer is progressing, the unease the customer experiences is further increased, resulting from the long wait time in line with the amount of time consumed until completion of temporary storage of deposited bank notes due to per-denomination classification of the deposited bank notes into the temporary storage portion of denominated bank notes in the depositing process and in line with expenditure of time for returning the bank notes to the customer when the depositing is not approved.

Further, since the machine body is composed of such a structure of three divisions, in which it is divided into the upper structure unit, intermediate structure unit and lower structure unit, there is a problem in that the structure is complicated. In particular, although there is no alternative in that the lower structure unit is drawn out to the maximum so that all the denominated bank note storage portions are exposed, it is necessary to drawn out to the maximum the intermediate structure unit as in the lower structure unit, wherein the structure regarding the drawing-out of the intermediate structure unit is also complicated.

In addition, in a prior art circulating type bank note depositing and dispensing machine, there remains still another problem in that the bottom plate of the temporary storage portion of denominated bank notes is opened by hand in a state where the intermediate structure unit is drawn out halfway and the bank notes accommodated in the temporary storage portions of denominated bank notes in the lower structure unit are taken out, that is, a problem in that no safety box feature is employed in the denominated bank note storage portion of the lower structure unit.

In view of the above-described problems and shortcomings, the present invention was developed. It is therefore a first object of the invention to provide a circulating type bank note depositing and dispensing machine having a simple structure, which enables a customer to observe and check the progressing state of a depositing process or a dispensing process, quickly carries out temporary storage of deposited bank notes, and quickly and easily returns temporarily stored bank notes to a customer when the depositing is not approved, and it is a second object of the invention to provide a circulating type bank note depositing and dispensing machine which is provided with a safety box feature in the lower structure unit including denominated bank note storage portions in addition to the first object.

A circulating type bank note depositing and dispensing machine according to a first aspect of the invention is a circulating type bank note depositing and dispensing machine in which deposited bank notes are used for dispensing bank notes, wherein a bank note dispensing portion through which bank notes are dispensed and a bank note depositing portion through which bank notes are deposited are disposed on the upper side of the machine body; an occupancy instructing portion for instructing at which left or right side a process is occupied is disposed at both the left and right side areas, respectively, in the installation area of said bank note dispensing portion and bank note depositing portion on the upper side of said machine body; a temporary storage portion for collectively storing deposited bank notes and temporarily storing the same is disposed at the front side area of said machine body; and a front side door which can collectively take out temporarily stored bank notes from the front side of said temporary storage portion for temporarily storing bank notes when depositing is not approved is disposed at the front side of the temporary storage portion of deposited bank notes so as to be openable and closable.

And, with such a construction, since the bank note depositing port and bank note dispensing port are, respectively, disposed on the upper side of the machine body, it becomes possible for a customer to observe or check the progressing state of a depositing process or dispensing process, and it becomes possible to prevent the customer from experiencing a sense of unease. Further, since the deposited bank notes are temporarily and collectively stored in the temporary storage portion of deposited bank notes, temporary storage of the deposited bank notes can be quickened, the temporary storage portion of deposited bank notes is disposed at the front side area of the machine body, and temporarily stored bank notes can be collectively taken out from the front side of the machine body by opening the front door of the temporary storage portion of deposited bank notes when the depositing is not approved, it becomes quick and easy to return the temporarily stored bank notes to a customer when the depositing is not approved by the customer, and the structure thereof can be simplified.

A circulating type bank note depositing and dispensing machine according to a second aspect of the invention is a circulating type bank note depositing and dispensing machine, in which deposited bank notes are used for dispensing banknotes; wherein an upper structure unit and a lower structure unit are, respectively, provided on the machine body so as to be drawn out from the front side of said machine body; in said upper structure unit, a bank note dispensing portion through which bank notes are dispensed in order from the front side thereof and a bank note depositing portion through which bank notes are deposited are, respectively, disposed on the upper front side of said machine body; an occupancy instructing portion for instructing at which left or right side a process is occupied is disposed at both the left and right sides, respectively, in the installation area of the bank note dispensing portion and bank note depositing portion on the upper front side of said machine body; a temporary storage portion for collectively storing deposited bank notes and temporarily storing the same is disposed at the front side area of said machine body; taking-in and taking-out means is provided which takes deposited bank notes sheet by sheet in the temporary storage portion for temporarily storing deposited bank notes and at the same time takes out temporarily deposited bank notes sheet by sheet when depositing is approved; a front side door which can collectively take out temporarily stored bank notes from the front side of said temporary storage portion for temporarily storing bank notes when depositing is not approved is disposed at the front side of the temporary storage portion of deposited bank notes so as to be openable and closable; and bank note conveying portion of an upper structure unit is disposed which conveys bank notes by connecting the bank note dispensing portion, bank note depositing portion and temporary storage portion of deposited bank notes; a bank note identifying portion which identifies bank notes is disposed at bank note conveying portion of the upper structure unit; in the lower structure unit, a reject box which accommodates rejected bank notes is disposed at the front side area of said machine body; denominated bank note storage portions which accommodate bank notes per denomination are disposed in the front and rear direction in the rear area of said reject box; a bank note receiving and taking out portion which receives bank notes and takes out the same sheet by sheet is disposed in said respective denominated bank note storage portion; and bank note conveying portion of a lower structure unit which conveys bank notes by connecting the bank note receiving and taking-out portions is disposed; and in any one of said machine body and said lower structure unit, a covering member which covers up the lower structure unit when the lower structure unit accommodated in said machine body is closed, a first connection passage which connects bank note conveying portion of said upper structure unit and bank note conveying portion of said lower structure unit, and a second connection passage which connects bank note conveying portion of said upper structure unit and said reject box are respectively disposed; and a first opening for said first connection passage and a second opening for said second connection passage are provided in said covering member.

With such a construction, since the bank note depositing port and bank note dispensing port are, respectively, disposed on the upper side of the machine body, it becomes possible for a customer to observe or check the progressing state of a depositing process or dispensing process, and it becomes possible to prevent the customer from experiencing a sense of unease. Further, since the deposited bank notes are temporarily and collectively stored in the temporary storage portion of deposited bank notes, temporary storage of the deposited bank notes can be quickened, the temporary storage portion of deposited bank notes is disposed at the front side area of the machine body, and temporarily stored bank notes can be collectively taken out from the front side of the machine body by opening the front door of the temporary storage portion of deposited bank notes when the depositing is not approved, it becomes quick and easy to return the temporarily stored bank notes to a customer when the depositing is not approved by the customer, and the structure thereof can be simplified. In addition, since the lower structure unit accommodated in the machine body is covered up by a covering member in a blocked state, it is not possible to take out bank notes from the denominated bank note storage portions of the lower structure unit even if the upper structure unit is drawn out, wherein it is possible to provide the lower structure unit including the denominated bank note storage portions with a safety box feature.

The circulating type bank note depositing and dispensing machine according to a third aspect of the invention is featured, in addition to the second aspect, in that said covering member is fixed on the machine body and is capable of opening bank note conveying portion of said lower structure unit, said respective denominated bank note receiving and taking-out portion and respective denominated bank note storage portion when the lower structure unit is drawn out.

And, with such a construction, since the covering member is fixed on the machine body, it becomes possible to provide the lower structure unit with a safety box feature, for example, without employing a complicated structure by which the respective denominated bank note storage portion is made into a safety box structure, wherein bank note conveying portion of the lower structure unit, bank note receiving and taking-out portion per denominated bank note, and respective denominated bank note storage portions are automatically opened when drawing out the lower structure unit, and maintenance of the lower structure unit can be facilitated.

The circulating type bank note depositing and dispensing machine according to a fourth aspect of the invention is featured, in addition to the second aspect or the third aspect, in that said upper structure side bank note conveying portion, bank conveying portion of said lower structure unit and first connection passage are capable of reversing the conveying direction of bank notes.

And, with such a construction, since bank note conveying portion of the upper structure unit, bank note conveying portion of the lower structure unit and the first connection passage are able to reverse the conveying direction of bank notes, the conveying passage structure can be simplified, particularly, the height of the conveying passage structure can be lowered, and the degree of freedom can be increased in setting the upper side height of the machine body.

The circulating type bank note depositing and dispensing machine according to a fifth aspect of the invention is featured, in addition to any one of the first aspect through the fourth aspect, in that the temporary storage portion of deposited bank notes includes a plurality of engagement members which vary the tip end engagement position of bank notes taken in said temporary storage portion of deposited bank notes in response to the dimension in width in the taking-in direction of the bank notes; and is capable of positioning the rear ends of bank notes at a temporary storage position which can be taken out by the taking-in and taking-out means with the rear ends thereof matched regardless of the dimension in width in said taking-in direction.

And, with such a construction, since the tip end engagement position of bank notes taken in the temporary storage portion of deposited bank notes is varied by any one of a plurality of engagement members in response to the dimension in width in the taking-in direction of the bank notes to be taken in, even bank notes whose dimensions in width in the taking-in direction differ per denomination, for example, like foreign banknotes, can be securely positioned at the temporary storage position where bank notes can be taken out by the taking-in and taking-out means with the rear ends of the bank notes matched to each other regardless of differences in the width in the taking-in direction, and the temporarily stored bank notes can be securely taken out by the taking-in and taking-out means.

The circulating type bank note depositing and dispensing machine according to a sixth aspect of the invention is featured, in addition to any one of the first aspect through the fifth aspect, in that bank notes in the bank note depositing port and bank note dispensing port are visible from both the upward front side and the upward rear side.

And, with such a construction, since bank notes in the bank note depositing port and bank note dispensing port are visible from both the upward front side and the upward rear side, it is possible to observe and check the progressing state of a depositing process or a dispensing process from both the teller side and the customer side.

The circulating type bank note depositing and dispensing machine according to a seventh aspect of the invention is featured, in addition to any one of the first aspect through the sixth aspect, in that the bank note depositing port and bank note dispensing port accommodate bank notes in an erect state; and said bank note dispensing port includes a transparent shutter that is closed when dispensing bank notes and is opened after the dispensing is carried out, and the bank notes in said bank note dispensing port are visible from both the upward front side and the upward rear side.

And, with such a construction, since bank notes are accommodated in an erect state in the bank note depositing port and bank note dispensing port, the bank note depositing state and dispensing state can be further easily observed by a customer in comparison to, for example, a case where bank notes are accumulated in the vertical direction in a horizontal state, wherein a customer's sense of ease can be brought. Further, the bank note dispensing port is provided with a transparent shutter that closes the bank note dispensing port during dispensing and opens the dispensing port when the dispensing is completed, and the bank notes in the bank note dispensing port are visible through the transparent shutter from both the upward front side and the upward rear side. Therefore, it becomes possible to confirm the depositing and the dispensing state of bank notes, and the bank note depositing port can be clearly distinguished from the bank note dispensing port.

PREFERRED EMBODIMENT OF THE INVENTION

Hereinafter, a description is given of an embodiment of the present invention with reference to the accompanying drawings.

Figure 2:
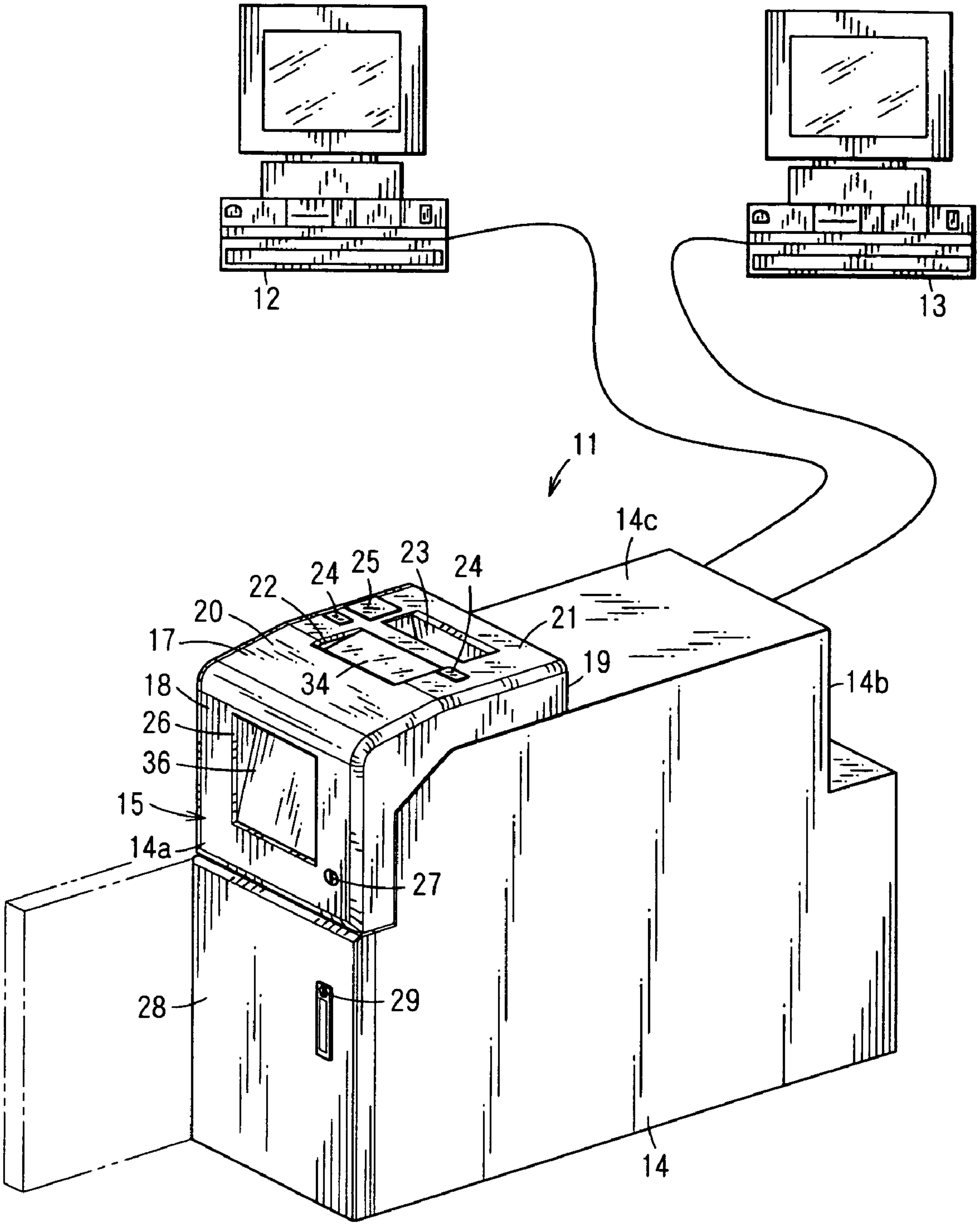
FIG. 2 is a configurational view of the same circulating type bank note depositing and dispensing machine.

FIG. 2 shows a circulating type bank note depositing and dispensing machine 11. The circulating type bank note depositing and dispensing machine 11 is installed in the counter of, for example, a bank between two tellers inside the counter, and can be used by both or either one of the left and right tellers of the circulating type bank note depositing and dispensing machine 11.

High-order terminals 12 and 13 operated by the two left and right tellers are connected to the circulating type bank note depositing and dispensing machine 11. Three ways of using the circulating type bank note depositing and dispensing machine 11 are available, wherein the circulating type bank note depositing and dispensing machine 11 may be used by any one of the high-order terminals 12 and 13 or may be used by both sides thereof.

The circulating type bank note depositing and dispensing machine 11 has a machine body 14, and the machine body 14 is composed to be a vertical type so that, where it is assumed that the operating side operated by tellers is the front side 14*a*, and the side opposed to the front side 14*a*, that is, the customer side outside the counter is the rear side 14*b*, it is narrow in lateral width in the left and right direction, is long in the front and rear direction, and high in the vertical direction.

Figure 3:
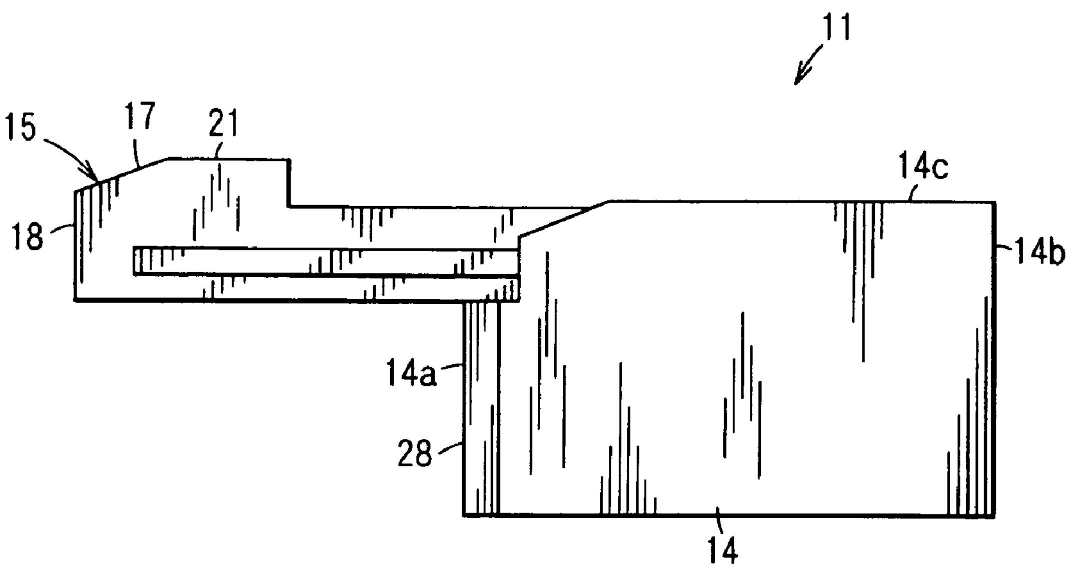
FIG. 3 is a side elevational view showing a drawn out state of the upper structure unit of the same circulating type bank note depositing and dispensing machine.
Figure 4:
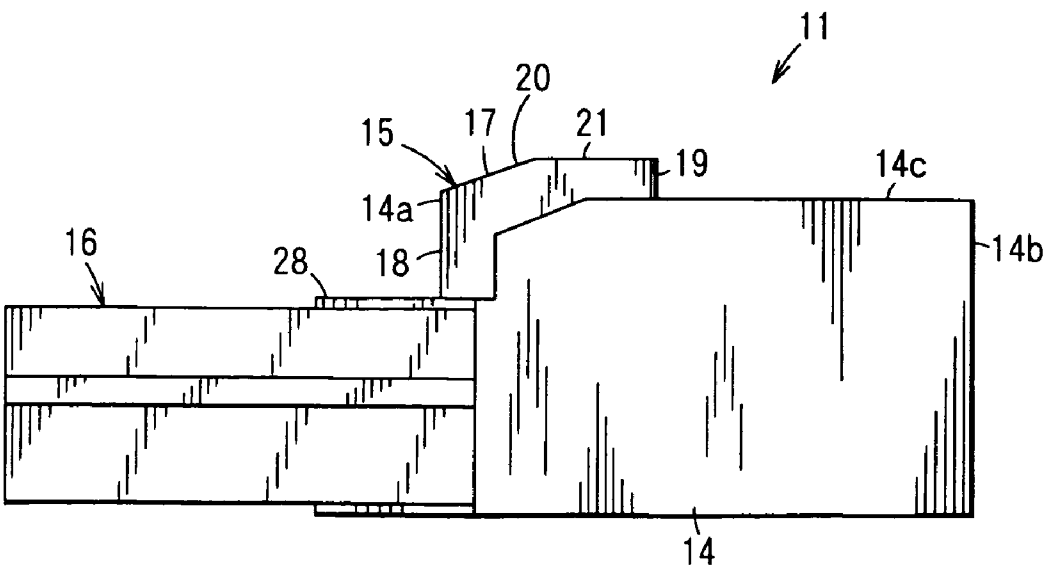
FIG. 4 is a side elevational view showing a drawn out state of the lower structure unit of the same circulating type bank note depositing and dispensing machine.

As shown in FIG. 3 and FIG. 4, the machine body 14 includes an upper structure unit 15 and a lower structure unit 16 so that the units 15 and 16 can be drawn out from the front side of the machine body 14.

As shown in FIG. 2, an upper side operating section 17 and a front side operating section 18 are disposed at the upper front side and the front upper side of the upper structure unit 15 as operating sections, respectively. And, the upper side operating section 17 protrudes upward from the upper surface 14*c* of the machine body 14, a step-down fitting portion 19 to which a counter is attached is formed on the upper side area of the machine body 14 rearward of the upper side operating section 17, and a counter having a width dimension equivalent to the length from the step-down fitting portion 19 to the rear side 14*b* of the machine body 14 is fitted to and disposed on the upper surface 14*c* of the machine body 14. Further, the upper surface of the upper side operating section 17 is disposed at a height position roughly equivalent to the top surface of the counter.

On the upper side operating section 17 of the upper structure unit 15, that is, on the upper front side of the machine 14, an inclination plane 20 inclined forward and a roughly horizontal plane 21 are formed in order from the front side. And, a bank note dispensing port 22 through which bank notes are dispensed and a bank note depositing port 23 through which bank notes are deposited are formed on the horizontal plane 21 in order from the front side. An occupancy button 24 is, respectively, disposed at both left and right side areas of the installation area of the bank note dispensing port 22 and the bank note depositing port 23 as an occupancy instructing portion instructing at which left or right side the teller occupies a depositing process or a dispensing process. In addition, a display portion 25 which displays a clogged position of bank notes or the remaining quantity of bank notes is disposed at one side, that is, the left side of the installation area of the bank note dispensing port 22 and the bank note depositing port 23. The respective occupancy buttons 24 are provided with a lamp which is turned on when either side is operated and the machine is occupied.

An opening 26 is formed at the front side operating section 18 of the upper structure unit 15, through which bank notes that are required to be returned when the depositing is not approved after deposited bank notes are temporarily stored in a depositing process are taken out. The opening 26 is shut by the front side door 36. In addition, an upper structure unit key 27 which is operated by a teller and locks and unlocks the upper structure unit 15 in a state where the unit 15 is accommodated in the machine body 14. And, the upper structure unit 15 is drawn out from the machine body 14 by unlocking of the upper structure unit key 27.

A door body 28 is attached at the front lower area of the machine body 14 so as to be opened and closed, and the lower structure unit key 29, which is locked and unlocked in a state where the lower structure unit 16 is housed in the machine body 14 and the door body 28 is closed, and which can be operated by only a superior of a financial institution or staff of a security company, is provided in the door body 28. If the door body 28 is unlocked and opened, the lower structure unit 16 can be drawn out forward from the machine body 14. Further, the lower structure unit 29 cannot be unlocked by a teller.

Figure 1:
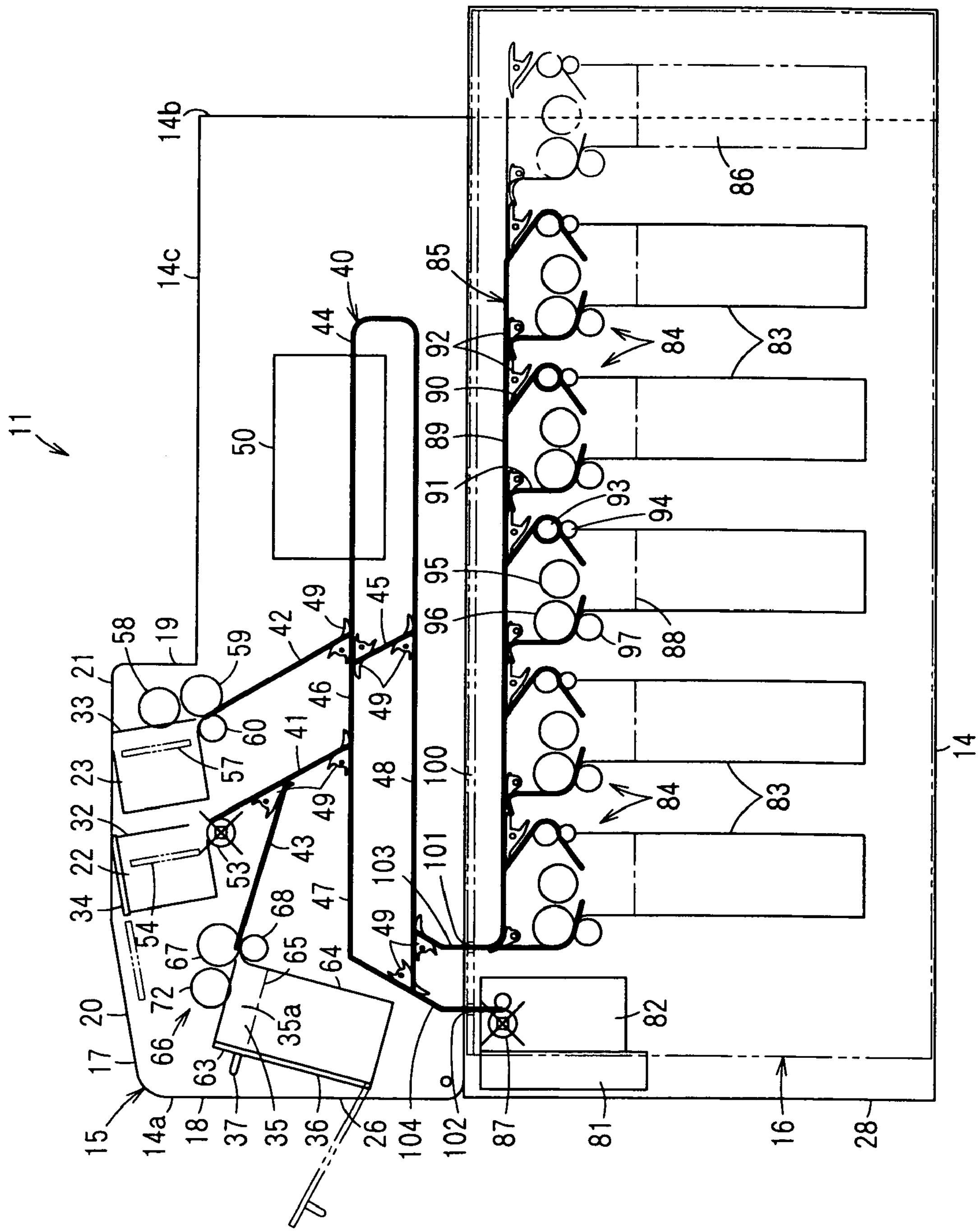
FIG. 1 is a general side elevational view of a circulating type bank note depositing and dispensing machine according to one embodiment of the present invention.

Also, as shown in FIG. 1 and FIG. 2, a box-shaped bank note dispensing portion 32 and a box-shaped bank note depositing portion 33, which store bank notes in an erect state with the short side of the rectangular bank notes placed vertically, are respectively disposed at the lower parts of the bank note dispensing port 22 and bank note depositing port 23 of the upper structure unit 15. A transparent shutter 34 that shuts the bank note dispensing port 22 when dispensing bank notes and opens when the dispensing is completed is disposed so as to be openable and closable at the bank note dispensing port 22, and the bank notes that are dispensed to the bank note dispensing portion 32 are made visible through the transparent shutter 34 which is closed when dispensing the bank notes.

A temporary storage portion 35 of deposited bank notes that receives deposited bank notes, which are identified as being authentic, that is, deposited authentic bank notes, and temporarily and collectively stores in a state where various types of bank notes are mixed is disposed inside the front side opening 26 of the upper structure unit 15, that is, the front side area of the machine body 14. A transparent front door 36 that is locked by an electromagnetic lock (not illustrated) in its closed state is disposed so as to be openable and closable at the front side of the temporary storage portion 35 of deposited bank notes, and the electromagnetic lock is released when returning the temporarily stored bank notes, wherein a handle 37 attached to the front side door 36 is held by hand and is opened forward from the opening 26, and it becomes possible to collectively take out temporarily stored bank notes in the temporary storage portion 35 of deposited bank notes through the opening 26 when the deposited bank notes are not approved.

An upper structure unit side bank note conveying portion 40 which is connected to the bank note dispensing portion 32, bank note depositing portion 33 and temporary storage portion 35 of deposited bank notes and conveying bank notes is provided in the upper structure unit 15. Bank note conveying portion 40 of the upper structure unit 15 includes a dispensing conveying passage 41 for conveying bank notes to the bank note dispensing portion 32, a depositing conveying passage 42 for conveying bank notes taken out from the bank note depositing portion 33, a storage conveying passage 43, connected midway at the dispensing conveying passage 41, for conveying bank notes between there and the temporary storage portion 35 of deposited bank notes, an identification conveying passage 44 which is folded back from rearward to frontward to be roughly U-shaped and has one end at the upper side thereof connected to the depositing conveying passage 42, a bypass conveying passage 45 for connecting one end at the upper side of the identification conveying passage 44 to the other end at the lower side thereof, a stored bank note dispensing conveying passage 46 connected between the dispensing conveying passage 41 and one end (the upper end of the bypass conveying passage 45) at the upper side of the identification conveying passage 44, a reject bank note conveying portion 47 connected to the stored bank note dispensing conveying portion 46 and extending forward thereof, and a received bank note dispensing conveying passage 48 which is connected to the other end at the lower side (the lower end of the bypass conveying passage 45) of the identification conveying passage 44, extends forward, and has its front end connected to the reject bank note conveying passage 47. At least the dispensing conveying passage 41, stored bank note conveying passage 43, identification conveying passage 44, stored dispensing conveying passage 46 and received bank note dispensing conveying passage 48 are capable of reversing the conveying direction of bank notes. Changing members 49 for switching the progressing direction of bank notes are provided at the connections among the respective conveying passages 41 through 48. A bank note identification portion 50 that identifies authenticity and denomination of conveyed bank notes is disposed in the identification conveying passage 44.

The bank note dispensing portion 32 is provided with an blade roller 53 and a tray 54. The blade roller 53 takes bank notes conveyed by the dispensing conveying passage 41 in the bank note dispensing portion 32 sheet by sheet in an erect state, and the tray 54 receives the bank notes taken in by the blade roller 53 in an erect state, and moves forward in response to the quantity of the received bank notes for lining up and accumulating bank notes while holding an erect posture of bank notes with the bank note receiving position made constant.

The bank depositing portion 33 is provided with a tray 57 for receiving the deposited bank notes in an erect state, a kick roller 58 for taking back bank notes pushed by the tray 57 moving when a depositing process is commenced, which are lined up and accumulated in an erect state, sheet by sheet, and a feed roller 59 and a gate roller 60, between which bank notes taken out by the kick roller 58 are held, for sending the same to the depositing conveying passage 42.

The storage conveying passage 43 is connected to the rear upper side of the temporary storage portion 35 of deposited bank notes, and the rear upper side thereof is inclined downward toward the rear side. Bank notes are accumulated in the vertical direction on an accumulation stacker 65 which elevates in the temporary storage portion 35 of deposited bank notes between the front side wall 63 being the front side door 36 enclosing the surrounding of the storage space 35*a* in the temporary storage portion 35 of deposited bank notes and the rear side wall 64.

Figure 5:
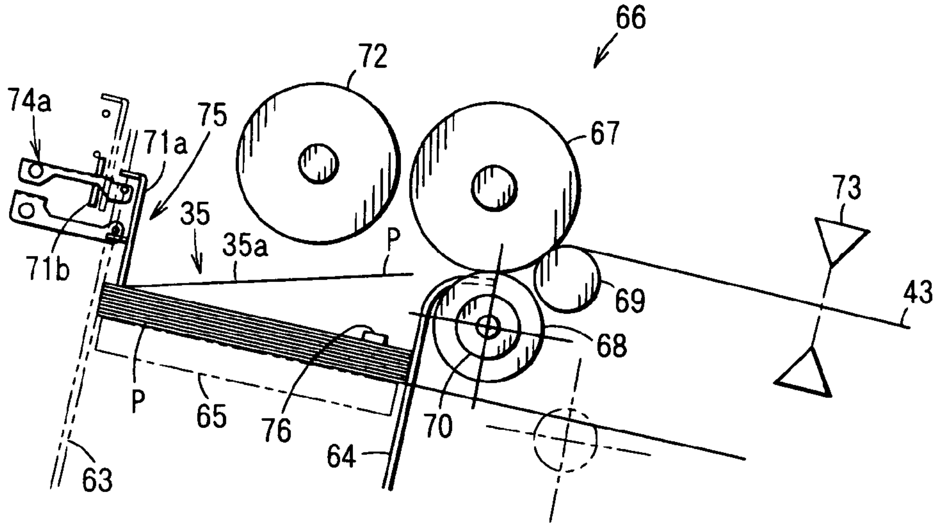
FIG. 5 is a side elevational view showing a part of the temporary storage portion of deposited bank notes of the same circulating type bank note depositing and dispensing machine.
Figure 6:
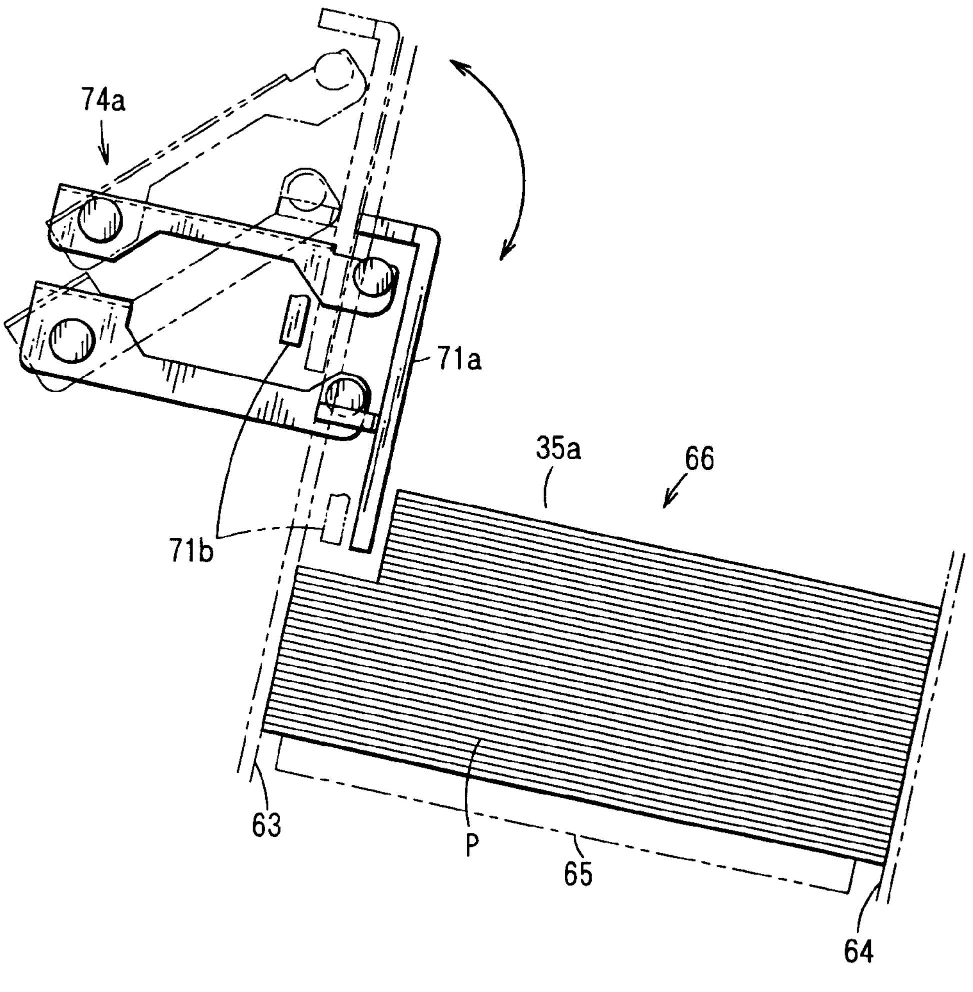
FIG. 6 is an enlarged side elevational view showing a part of the temporary storage portion of deposited bank notes of the same circulating type bank note depositing and dispensing machine.

The temporary storage portion 35 of deposited bank notes is provided with a taking-in and taking-out means 66 that takes in the deposited bank notes in the temporary storage portion 35 of deposited bank notes from the storage conveying passage 43 sheet by sheet, and simultaneously takes out the temporarily stored bank notes to the storage conveying passage 43 sheet by sheet. As shown in FIG. 5 and FIG. 6, the taking-in and taking-out means 66 operates in conjunction with the accumulation stacker 65 that accommodates bank notes (shown by symbol P in the drawings, and hereinafter omitted) therein and elevates. And, the taking-in and taking-out means 66 is provided with a plurality of gate rollers 68 and gate rollers 68 in the axial direction along which bank notes are taken in the temporary storage portion 35 of deposited bank notes from the storage conveying passage 43 and simultaneously are taken out from the temporary storage portion 35 of deposited bank notes to the storage conveying portion 43, conveying rollers 69 for holding bank notes between the same and the feed rollers 67 and conveying the bank notes, blade rollers 70 for moving to the side position of the feed roller 67, taking in bank notes sheet by sheet, and shunting from the side position of the gate rollers 68 to the standby position shown with a two-dashed chain line in FIG. 5 when taking out bank notes, stoppers 71*a* and 71*b* that selectively advance from outside of the storage space 35*a* of the temporary storage portion 35 of deposited bank notes into the storage space 35*a*, stop the tip end in the taking-in direction of the bank notes to be taken in, line up the rear ends in the taking-in direction of bank notes, and locate the bank notes in the temporary storage position from which the bank notes can be taken out by the taking-in and taking-out means 66, and kick rollers 72 for taking out temporarily stored bank notes on the accumulation stacker 65 between the feed rollers 67 and gate rollers 68 sheet by sheet when taking out the bank notes.

Engagement (catching) of the tip ends in the taking-in direction of bank notes by the stoppers 71*a* and 71*b* is selectively carried out on the basis of the bank note width in the short side direction of bank notes by denomination identification in the bank note identification portion 50 and detection by the bank note detection sensor 73 disposed in the storage conveying portion 43. That is, the widths of bank notes are set as groups of short-widths, intermediate-widths and long-widths, the short-width bank notes are identified by the bank note identification portion 50, and the short-width bank notes are detected by the bank note detection sensor 73, whereby the stopper 71*a* advances from outside of the storage space 35*a* to inside of the storage space 35a, and stands by for engagement of the short-width bank notes to be taken in. The stopper 71*a* is pressed to the position of the lower limit by a spring with respect to a stopper support and movement mechanism 74*a*. And, in a case where only the short-width bank notes of the accumulated bank notes are accumulated in the upper area when the stopper 71*a* advances to the position of engagement, as shown in FIG. 6, the stopper 71*a* is positioned at the front side of the tip end of the accumulated bank notes and stands by for engagement of the subsequent short-width bank notes. Also, in a case where only the intermediate-width bank notes or long-width bank notes of the accumulated bank notes are accumulated in the upper area, the stopper 71*a* is placed on the upper surface of the accumulated bank notes, presses the upper surface of the accumulated bank notes, and stands by for engagement of the subsequent short-width bank notes. In this case, in FIG. 6, the stopper 71*a* placed on the upper surface of the accumulated bank notes is positioned at its elevated state against the force of the spring. Thus, the states of the accumulated bank notes differ at the engagement position in compliance with the short-width, intermediate-width or long-width bank notes. In addition, after the stopper 71*a* catches the short-width bank notes, it immediately retreats outside of the storage space 35*a*, and stands by for taking-in of subsequent bank notes into the storage space 35*a*.

Also, in a case where the bank notes identified by the bank note identification portion 50 and detected by the bank note detection sensor 73 have intermediate widths, the stopper 71*b* advances from outside of the storage space 35*a* to the engagement position inside the storage space 35*a*. FIG. 5 shows an retreating position of the stopper 71*b*, and FIG. 6 shows the retreating position of the stopper 71*b* with a solid line and shows the engagement position with a two-dashed chain line. Further, the stopper 71*b* is supported by a stopper support and movement mechanism (not illustrated) the structure of which is similar to the stopper support and movement mechanism 74*a* of the stopper 71*a*. In addition, the point where the stopper 71*b* is pressed to the lower limit position by a spring with respect to the stopper support and movement mechanism is similar to the above. Therefore, when the stopper 71*b* advances, the stopper 71*b* is changed to a state where it is positioned at the front side of the tip end in the taking-in direction of the accumulated bank notes and to a state where it is placed on the upper surface of the accumulated bank notes, in compliance with whether the accumulated bank notes have a short-width, intermediate-width or long-width, and stands by for engagement of the intermediate-width bank notes to be taken in. After the intermediate-width bank notes are engaged, the stopper 71*b* immediately retreats outside of the storage space 35*a* and stands by for taking-in of subsequent bank notes into the storage space 35*a*.

Also, where the bank notes identified by the bank note identification portion 50 and detected by the bank note detection sensor 73 have a long width, both the stoppers 71*a* and 71*b* remain in a retreated state. Therefore, the tip end in the taking-in direction of the long-width bank notes, which are taken in the storage space 35*a*, are stopped by the front side wall 63.

Accordingly, a plurality of engagement members 75 that change the tip end engagement positions of bank notes taken in the temporary storage portion 35 of deposited bank notes in response to the dimension of the width in the taking-in direction of bank notes are composed of the stoppers 71*a*, 71*b* and the front side wall 63.

Also, a level sensor 76 for detecting the upper surface height of bank notes accumulated on the accumulation stacker 65 when the bank notes are taken in is disposed in the temporary storage portion 35 of deposited bank notes.

And, the stoppers 71*a* and 71*b* are caused to selectively advance in response to the denomination identification in the bank note identification portion 50 when bank notes are taken in the temporary storage portion 35 of deposited bank notes, and the tip end in the taking-in direction of the bank notes taken in by the feed rollers 67, gate rollers 68 and blade rollers 70 are regulated by the stoppers 71*a* and 71*b* or the front side wall 63, and are accumulated at the temporary storage position where the rear ends of the bank notes are fitted to the rear side wall 64. The upper surface height of the temporarily stored bank notes, which are accumulated on the accumulation stacker 65, is monitored by the level sensor 76, wherein the height of the temporarily stored bank notes is increased, the accumulation stacker 65 is gradually lowered, thereby maintaining the upper surface height, at which the temporarily stored bank notes are received and accumulated, within a fixed range. In addition, when taking out banknotes from the temporary storage portion 35 of deposited bank notes, the accumulation stacker 65 is elevated in a state where the stoppers 71*a* and 72*b* are retreated outside of the storage space 35*a*, the temporarily stored bank notes are pressed to the kick roller 72. Then, the temporarily stored bank notes are paid out sheet by sheet by rotations of the kick roller 72 and feed roller 67.

Also, as shown in FIG. 1, a detachable box 81 that stores exchange tickets, gift coupon, etc., is detachably disposed at the front side area of the machine body 14 in the lower structure unit 16, and a reject box 82 that stores rejected bank notes are disposed and fixed. Further, denominated bank note storage portions 83 which store bank notes per denomination are arranged in the forward and backward direction, fixed and disposed at the rear side area of the reject box 82. Bank note receiving and taking-out portions 84 which receive bank notes and takes out the bank notes sheet by sheet are disposed above the respective denominated bank note storage portions 83, and bank note conveying portion 85 of a lower structure unit 16 which is connected to the respective bank note receiving and taking-out portions 84 and conveys bank notes is disposed at the upper side area of the denominated bank note storage portions 83. Also, an extension space 86 is formed at the extremely rear portion of the lower structure unit 16 in order to extend the denominated bank note storage portions 83 as necessary.

A taking-in means 87 which is able to take in bank notes from the upper part of the reject box 82 sheet by sheet is disposed at the reject box 82.

The accumulation stacker 88 is disposed so as to elevate in the respective denominated bank note storage portions 83, and bank notes are accumulated on the accumulation stacker 88 in the vertical direction.

Bank note conveying portion 85 of the lower structure unit 16 is provided with a main conveying passage 89 disposed in the forward and backward direction along the upper side areas of the denominated bank note storage portions 83, a taking-in conveying passage 90 for conveying bank notes to be conveyed from the main conveying passage 89 into the respective denominated bank note storage portions 83, and a taking-out conveying passage 91 for conveying bank notes, which are taken out from the respective denominated bank note storage portions 83, to the main conveying passage 89. A changing member 92 for changing the advancement direction of bank notes is provided at the connection parts of the respective conveying passages 89 through said taking-out conveying passage 91. The main conveying passage 89 of bank note conveying portion 85 of the lower structure unit 16 is capable of reversing the conveying direction of bank notes.

The bank note receiving and taking-out portion 84 operates in conjunction with the accumulation stacker 88 which elevates with bank notes placed thereon, and is provided with taking-in rollers 93 and 94 for taking in the bank notes from the taking-in conveying passage 90 onto the accumulation stacker 88 when receiving bank notes, a kick roller 95 for taking out bank notes on the accumulation stacker 88 sheet by sheet when taking out the bank notes, a taking-out roller 96 for taking out the bank notes taken out by the kick roller 95 onto the taking-out conveying portion 91, and a gate roller 97. And, since the upper surface height of bank notes is increased whenever receiving and accumulating bank notes onto the accumulation stacker 88 when taking in bank notes into the denominated bank note storage portion 83, the accumulation stacker 88 is gradually lowered to receive bank notes, whereby the upper surface height on which bank notes are received and accumulated can be maintained within a fixed range. Also, when taking out bank notes from the denominated bank note storage portion 83, the accumulation stacker 88 is elevated and bank notes are pressed to the kick roller 95, whereby the bank notes are taken out sheet by sheet by rotations of the kick roller 95.

Also, a plate-shaped covering member 100 that covers up the upper surface of the lower structure unit 16, which is housed in the machine body 14, in a closed state is fixed between the upper structure unit 15 and the lower structure unit 16 in the machine body 14. The first opening 101 and second opening 102 are, respectively, formed at the front end side of the covering member 100. The first connection passage 103 that connects the front end side of the received bank note dispensing conveying passage 48 of bank note conveying portion 40 of the upper structure unit 15 and the front end side of bank note conveying portion 85 of the lower structure unit 16 to each other and conveys bank notes is disposed in the first opening 101. The second connection passage 104 that connects the reject bank note conveying passage 47 of bank note conveying portion 40 of the upper structure unit 15 and the reject box 82 to each other and conveys bank notes is disposed in the second opening 102. The first connection passage 103 and second connection passage 104 are connected to each other, through the first opening 101 and second opening 102 of the covering member 100 fixed on the machine body 14 side, in a state where the upper structure unit 15 and lower structure unit 16 which are drawable with respect to the machine body 14 are accommodated in the machine body 14, and are capable of conveying bank notes between the upper structure unit 15 and the lower structure unit 16. Further, the first connection passage 103 and the second connection passage 104 are capable of reversing the conveying direction of bank notes.

Next, a description is given of actions of the present embodiment.

Figure 7:
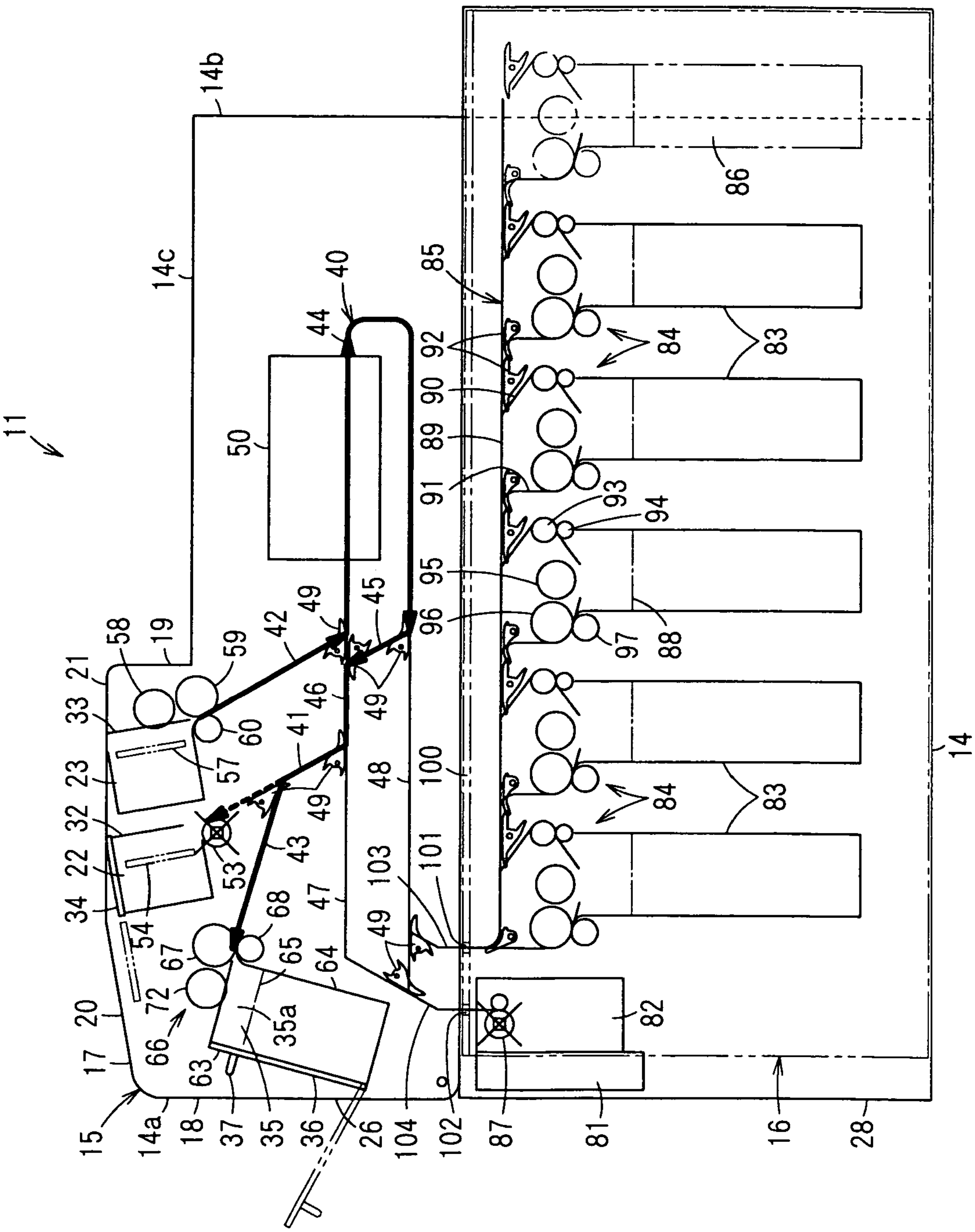
FIG. 7 is a view describing a flow of deposited bank notes to temporary storage when a depositing process is carried out in the same circulating type bank note depositing and dispensing machine.
Figure 8:
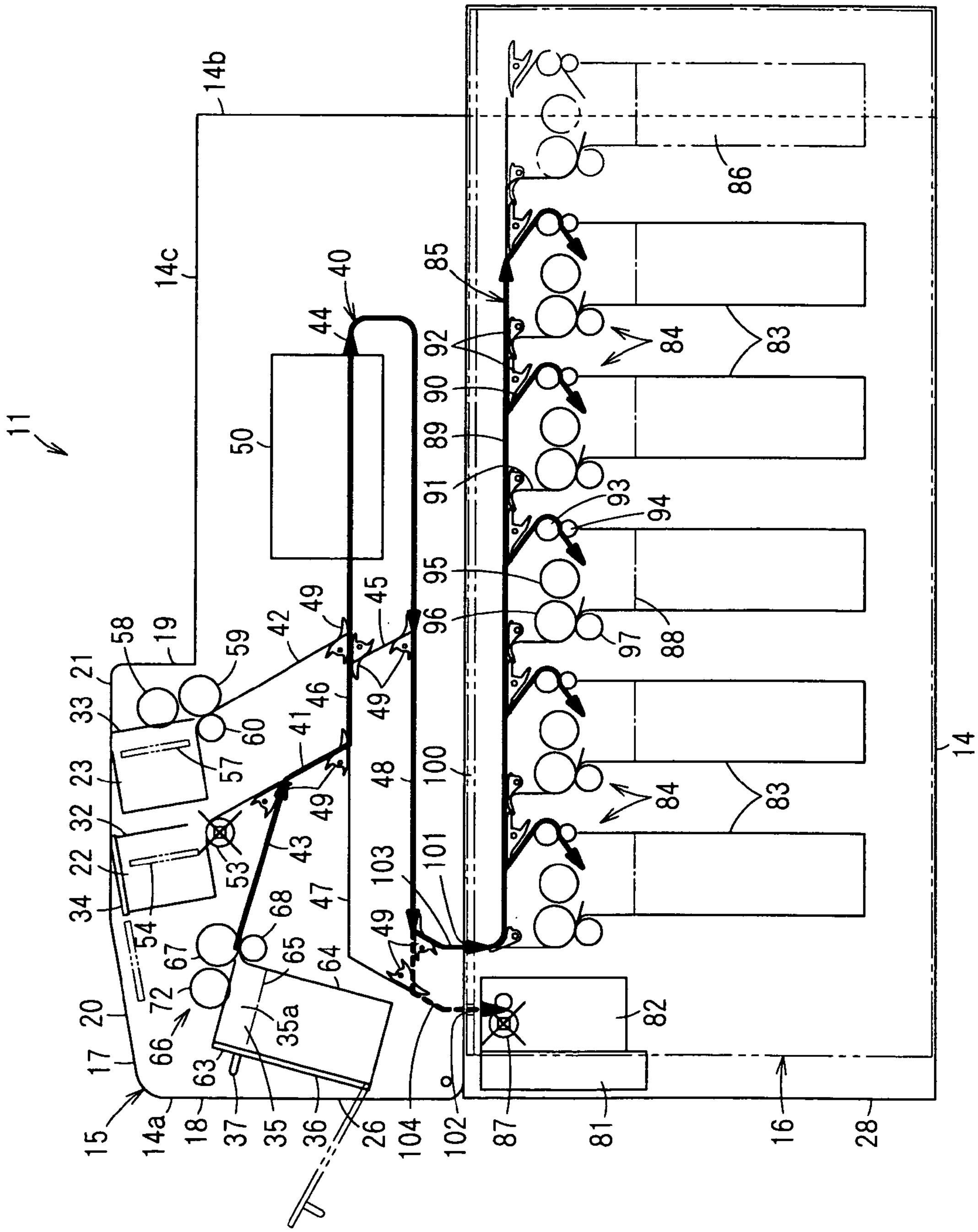
FIG. 8 is a view describing a flow of temporarily stored bank notes according to depositing approval after temporary storage is completed when a depositing process is carried out in the same circulating type bank note depositing and dispensing machine.

First, a description is given of a depositing process with reference to FIG. 7 and FIG. 8.

Where the circulating type bank note depositing and dispensing machine 11 is used by, for example, the left side teller, the teller presses the left side occupancy button 24, the occupancy mode of the left side teller is brought about.

Deposited bank notes received by the left side teller over the counter of a financial institution are inputted into the bank note depositing port 23, and a depositing process is commenced by operating the high-ranked terminal 12 of the left side teller for a depositing start process.

As shown in FIG. 7, the deposited bank notes inputted into the bank note depositing port 23, the erect state of which is maintained, are conveyed from the bank note depositing port 23 into the depositing conveying passage 42 of bank note conveying portion 40 of the upper structure unit 15, and are conveyed to the identification conveying passage 44. Then, the bank notes are identified by the bank note identification portion 50.

Deposited bank notes which are identified to be authentic by the bank note identification portion 50 are conveyed from the identification conveying passage 44 into the storage space **35*a* of the temporary storage portion 35 of deposited bank notes through the bypass conveying passage 45, storage dispensing conveying portion 46, dispensing passage 41 and storage conveying portion 43**, and are temporarily stored.

Deposited bank notes which are determined to be unidentifiable by the bank note identification portion 50, that is, non-identified bank notes are conveyed from the identification conveying portion 44 into the bank note dispensing port 22 in an erect state through the bypass conveying passage 45, storage dispensing conveying passage 46 and dispensing conveying passage 41. The transparent shutter 34 is opened at the moment when temporary storage of the deposited bank notes is terminated, and the non-identified bank notes are taken out. After the non-identified bank notes are taken out by a teller from the bank dispensing port 22, the transparent shutter 34 is closed. The non-identified bank notes are returned to the customer.

At this time, since the deposited bank notes in the bank note depositing port 23 which is disposed on the upper surface of the machine body 14 is made visible at both a teller side and a customer side, it is possible to observe and check the progressing state of a depositing process including the state where deposited bank notes inputted in the bank note depositing port 23 are taken in sheet by sheet, wherein it is possible to provide the customer with a sense of ease. In addition, in regard to the bank note dispensing port 22, since non-identified bank notes which are sent into the bank note dispensing port 22 are made visible at both the teller side and the customer side through the transparent shutter 34 which closes the bank note dispensing port 22, it is possible for the customer to observe and check that there are non-identified bank notes in the bank notes deposited by the customer. Further, since the bank notes are accommodated in an erect state in the bank note depositing port 23 and the bank note dispensing port 22, it is possible for a customer to further easily check and understand the taking-in conditions of depositing bank notes and taking-out of dispensing, for example, in comparison to a case where bank notes are horizontally accumulated in the vertical direction. Also, since the front side door 36 that shuts and opens the storage space **35*a* of the temporary storage portion 35 of deposited bank notes is made transparent, the teller is able to visibly check the inside of the storage space 35*a***, which makes it very convenient.

And, after a process to temporary storage of all the deposited bank notes inputted in the bank note depositing port 23 is completed, the result of identification is displayed on a high-rank terminal 12, and the customer confirms approval or non-approval of the depositing.

As shown in FIG. 8, by the teller operating a depositing approval command by the high-rank terminal 12, a receipt action of the bank notes temporarily stored in the temporary storage portion 35 of deposited bank notes is commenced. The temporarily stored bank notes in the temporary storage portion 35 of deposited bank notes, that is, the received bank notes are taken out from the temporary storage portion 35 of deposited bank notes to the storage conveying passage 43 sheet by sheet, conveyed to the identification conveying passage 44 through the dispensing conveying passage 41 and storage dispensing conveying passage 46, and identified by the bank note identification portion 50.

The received bank notes identified to be authentic by the bank note identification port 50 are conveyed from the received bank note dispensing conveying passage 48 to the main conveying passage 89 of bank note conveying portion 85 of the lower structure unit through the first connection passage 103. The received bank notes are conveyed from the main conveying passage 89 into the corresponding denominated bank note storage portions 83 through the corresponding taking-in conveying passage 90 corresponding thereto and are accumulated and received therein.

Also, by the teller operating a non-approval command of the depositing by a high-rank terminal 12, the electromagnetic lock which locks the front side door 36 of the temporary storage portion 35 of deposited bank notes is unlocked. The teller holds the handle 37 of the front side door 36 and opens the door forward from the opening 26 of the machine body 14, collectively takes out the temporarily stored bank notes in the temporary storage portion 35 of deposited bank notes through the opening 26, returns the same to the customer and closes the front side door 36.

Figure 9:
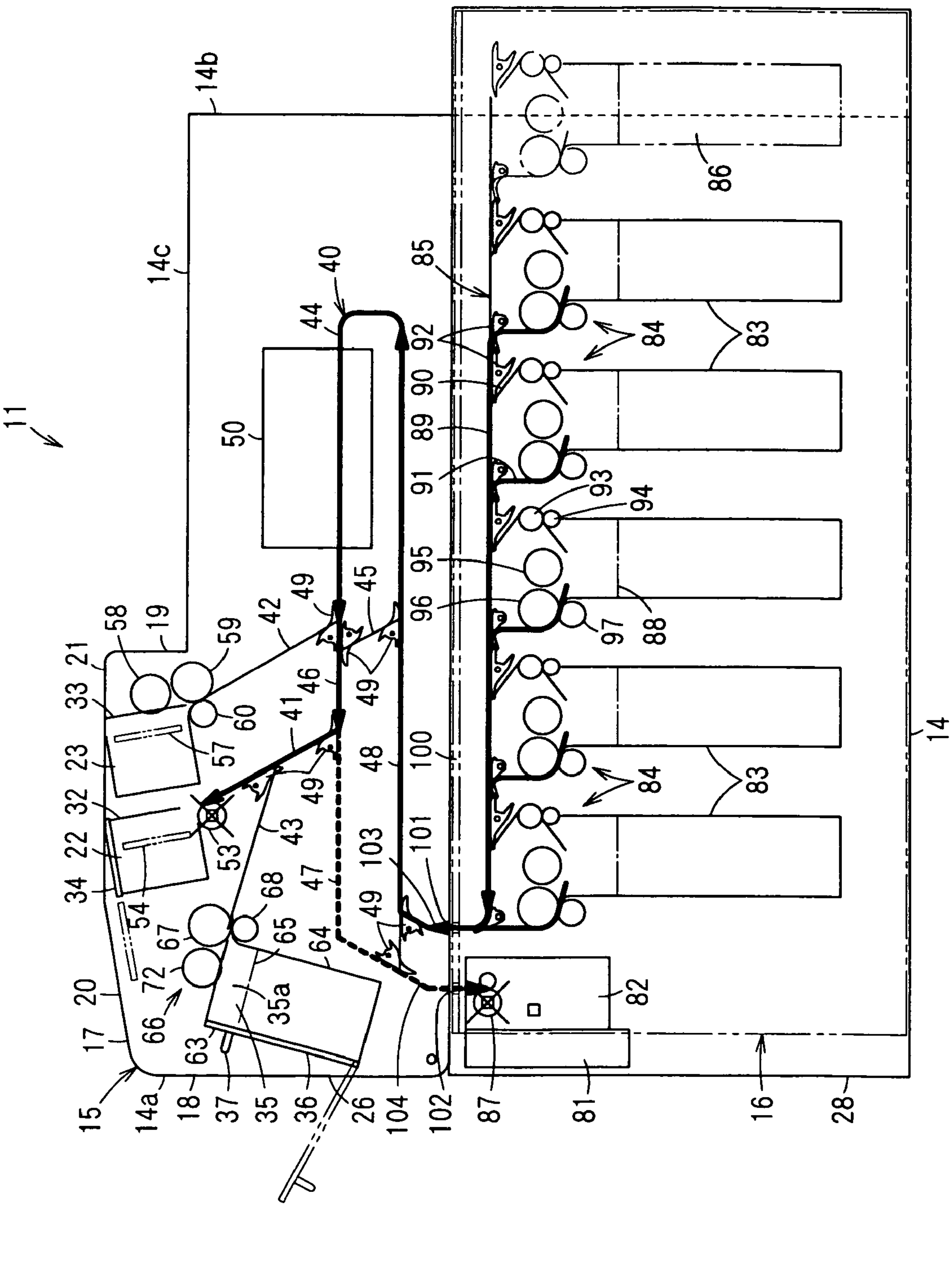
FIG. 9 is a view describing a flow of dispensing bank notes when a dispensing process is carried out in the same circulating type bank note depositing and dispensing machine.

Next, a description of a dispensing process with reference to FIG. 9 is given.

Where, for example, the left side teller uses a circulating type bank note depositing and dispensing machine 11, the occupancy mode of the left side teller is brought about by operating the left side occupancy button 24.

Using the high-rank terminal 12 of the left side teller, the teller inputs dispensing information such as the amount of money including the denomination and number thereof in response to a dispensing request from the customer on the counter of a financial institution, and operates a dispensing commencement, whereby a dispensing process is started.

Where only one denomination of bank notes are dispensed, bank notes of the corresponding denomination are paid out sheet by sheet from only the denominated bank note storage portion 83 of the corresponding denomination. Also, where a plurality of denominations of bank notes are dispensed, bank notes are taken out sheet by sheet in the pre-determined order of denomination in such a manner that, after bank notes of a specified denomination are taken out sheet by sheet from the denominated bank note storage portion 83 of the corresponding denomination, bank notes of the next denomination are taken out sheet by sheet from the denominated bank note storage portion 83 of the corresponding denomination, and the processing is repeated.

The bank notes taken out from the denominated bank note storage portion 83 are conveyed from the taking-out conveying passage 91 and main conveying passage 89 to the received bank note dispensing conveying passage 48 and identification conveying passage 44 of bank note conveying portion 40 of the upper structure unit 15 through the first connection passage 103, and are identified by the bank note identification portion 50.

The bank notes identified to be authentic by the bank note identification portion 50 are conveyed from the identification conveying portion 44 into the bank note dispensing port 22 through the storage dispensing conveying passage 46 and dispensing conveying passage 41 in an erect state and accumulated therein.

The bank notes determined to be unidentifiable by the bank note identification portion 50 are conveyed from the identification conveying passage 44 to the reject box 82 of the lower structure unit 16 through the storage dispensing passage 46, the reject bank note conveying portion 47 and the second connection passage 104, and stored therein.

At this time, since the bank note dispensing port 22 is disposed on the upper surface of the machine body 14 and bank notes to be dispensed, which are sent into the bank note dispensing port 22 through the transparent shutter 34 that shuts the bank note dispensing port 22, are made visible and checked at both the teller side and the customer side, it is possible to visibly confirm the progressing situations of a dispensing process including a state where the dispensing bank notes are conveyed into the bank note dispensing port 22 sheet by sheet, and a sense of ease can be provided to the customer. Further, since the bank notes are stored in the bank note dispensing port 22 in an erect state, it is possible for the customer to further easily know the taking-out condition for dispensing the bank notes in comparison to, for example, a case where bank notes are horizontally accumulated in the vertical direction.

After the dispensing bank notes corresponding to the amount of money to be dispensed are conveyed and accumulated in the bank note dispensing port 22, the transparent shutter 34 is opened. After a teller takes out the dispensing bank notes from the bank note dispensing port 22, the transparent shutter 34 is closed. The dispensing bank notes are handed over from the teller to the customer.

Next, a description is given of a replenishment process.

The flow of bank notes in the replenishment process is similar to the flow of depositing bank notes in the above-described depositing process. A description is given with reference to FIG. 7 and FIG. 8. In this case, it is assumed that the left side teller is engaged in the process using the high-rank terminal 12.

Bank notes to be replenished are inputted in the bank note depositing port 23, and a replenishment process is commenced by the left side teller inputting a replenishment start by the high rank terminal 12.

Replenishing bank notes inputted in the bank note depositing port 23, which are held in an erect state, are taken out from the bank note depositing port 23 into the depositing conveying passage 42 of bank note conveying passage 40 of the upper structure unit 15, and are further conveyed to the identification conveying port 44, wherein the bank notes are identified by the bank note identification portion 50.

Replenishing bank notes which are identified to be authentic by the bank note identification portion 50 are conveyed from the identification conveying passage 44 into the temporary storage portion 35 of deposited bank notes through the bypass conveying passage 45, storage dispensing conveying passage 46, dispensing conveying passage 41 and storage conveying passage 43, and are temporarily stored therein.

Bank notes which are not identified by the bank note identification portion 50 are conveyed from the identification conveying portion 44 into the bank note dispensing port 22 through the bypass conveying portion 45, storage dispensing conveying passage 46 and dispensing conveying passage 41, and are returned by opening of the transparent shutter 34 when all the replenishing bank notes identified are temporarily stored therein in the temporary storage portion 35. The bank notes which are not identified are taken out from the bank note dispensing port 22 by the teller. Thereafter, the transparent shutter 34 is closed.

And, when the process to temporary storage of all the replenishing bank notes which are inputted in the bank note depositing port 23 has been completed, the result of identification is displayed on the upper-rank terminal 12, and approval or non-approval of the receipt is confirmed. Also, herein, although an example of obtaining approval is illustrated, all the replenished bank notes inputted in the bank note depositing port 23 may be automatically shifted to the next process without obtaining approval after the process to temporary storage is completed.

By the teller operating a receipt approval command by the high-rank terminal 12, a receipt action of replenishing bank notes which are temporarily stored in the temporary storage portion 35 of deposited bank notes is commenced. Replenishing bank notes in the temporary storage portion 35 of deposited bank notes are conveyed from the temporary storage portion 35 of deposited bank notes to the storage conveying passage 43 sheet by sheet, and conveyed into the identification conveying passage 44 through the dispensing conveying passage 41 and storage dispensing conveying passage 46, wherein the bank notes are identified by the bank note identification portion 50.

The replenishing bank notes identified to be authentic by the bank note identification portion 50 are conveyed from the storage dispensing conveying passage 48 into the main conveying passage 89 of bank note conveying portion 85 of the lower structure unit 16 through the first connection passage 103, and are taken in from the main conveying passage 89 in the corresponding denominated bank note storage portions 83 through the taking-in conveying passage 90 of the corresponding denomination, wherein the bank notes are received and accumulated therein.

Bank notes not identified by the bank note identification portion 50 are taken in from the storage dispensing conveying passage 48 in the reject box 82 of the lower structure unit 16 through the second connection passage 104 and received therein.

Further, by the teller operating a receipt non-approval command by the high-rank terminal 12, the electromagnetic lock that locks the front side door 36 of the temporary storage portion 35 of deposited bank notes is unlocked. The teller holds the handle 37 of the front side door 36 and opens forward from the opening 26, collectively takes out the replenishing bank notes in the temporary storage portion 35 of deposited bank notes through the opening 26, and closes the front side door 36.

Next, a description is given of a collection process.

A flow of bank notes collected in the collection process is similar to that of the dispensing bank notes in the above-described dispensing process. A description is given with reference to FIG. 9. In this case, the left side teller carries out a process using the high-rank terminal 12.

By commanding a collection process by the high-rank terminal 12, bank notes are taken out sheet by sheet in a predetermined order in such a manner that bank notes are taken out sheet by sheet from the denominated bank note storage portion 83 of a specified denomination in order, and thereafter the taking-out is completed, bank notes are taken out sheet by sheet from the denominated bank note storage portion 83 of the next denomination.

Bank notes taken out from the denominated bank note storage portions 83 are conveyed from the taking-out conveying passage 91 and main conveying passage 89 to the storage dispensing conveying passage 48 of the upper structure unit and identification conveying passage 44 thereof through the first connection passage 103, and are identified by the bank note identification portion 50.

The bank notes identified to be authentic by the bank note identification portion 50 are conveyed from the identification passage 44 to the bank note dispensing port 22 through the storage dispensing conveying passage 46 and dispensing conveying passage 41 and are accumulated in an erect state.

When a prescribed number of bank notes, which can be accumulated in the bank note dispensing port 22, are taken out from the denominated bank note storage portion 83, the taking-out is temporarily stopped. After the collected bank notes existing on the conveying passage are taken in the bank note dispensing port 22 and are accumulated therein, the transparent shutter 34 is opened. After the collected bank notes are taken out by the teller from the bank note dispensing port 22, the transparent shutter 34 is closed, and a collection process of bank notes to be collected from the denominated bank note storage portion 83 is re-started.

The bank notes not identified by the bank note identification port 50 are taken in the reject box 82 of the lower structure unit 16 through the storage dispensing conveying passage 46 from the identification conveying passage 44 and through the second connection passage 104 from the reject bank note conveying passage 47, and are received therein.

Thus, according to the circulating type bank note depositing and dispensing machine 11, since the bank note depositing port 23 and bank note dispensing port 22 are, respectively, disposed on the upper surface of the machine body 14, it becomes possible to observe the progressing condition of a depositing process or a dispensing process at the customer side, wherein no sense of unease is provided to the customer. Further, deposited bank notes can be temporarily collectively stored in the temporary storage portion 35 of deposited bank notes, wherein temporary storage of the deposited bank notes can be quickly processed, and at the same time, since the temporary storage portion 35 of deposited bank notes is disposed at the front side area of the machine body 14, and temporarily stored bank notes can be collectively taken out from the front side of the machine body 14 by opening the front side door 36 of the temporary storage portion 35 of deposited bank notes when the depositing is not approved, the temporarily stored bank notes can be quickly and easily returned when the depositing is not approved. In addition, the structure can be made simple.

Further, since bank notes are received in the bank note depositing port 23 and bank note dispensing port 22 in an erect state, it becomes possible for a customer to further easily know the taking-in of depositing bank notes and taking-out of dispensing the same, wherein the customer is provided with a sense of ease.

Further, the transparent shutter 34 is provided at the bank note dispensing port 22, which shuts the bank note dispensing port 22 when dispensing bank notes and opens the shutter when the dispensing is completed, and the bank notes in the bank note dispensing port 22 can be visibly observed from both the front upper side and the rear upper side through the transparent shutter 34. Therefore, it becomes possible to confirm the taking-out state of dispensing bank notes, and it is possible to clearly discriminate the bank note depositing port 23 from the bank note dispensing port 22 from each other.

In addition, in order to cover up the lower structure unit 16 housed in the machine body 14 by using the covering member 100, bank notes cannot be picked up from the denominated bank note storage portions 83 of the lower structure unit 16 even if the upper structure unit 15 is drawn out, wherein the lower structure unit 16 having the denominated bank note storage portions 83 can be provided with a safety box feature. As a result, although the upper structure unit 15 can be drawn out from the machine body 14 by a teller, the lower structure unit 16 cannot be drawn out from the machine body 14 by any teller but can be drawn out by only a superior of the financial institution or staff of a security company.

Further, since the covering member 100 is fixed on the machine body 14, the lower structure unit 16 can be provided with a safety box feature without, for example, employing any complicated structure by which the respective denominated bank note storage portions 83 is made into a safety box structure, and when the lower structure unit 16 is drawn out, bank note conveying portion 85 of the lower structure unit 16, respective denominated bank note receiving and taking out portions 84, and respective denominated bank note storage portions 83 can be automatically opened, wherein maintenance at the lower structure unit 16 side can be facilitated.

Further, since bank note conveying portion 40 of the upper structure unit 15, bank note conveying portion 85 of the lower structure unit 16, first connection passage 103 and second connection passage 104 are capable of reversing the conveying direction of bank notes, the structure of the conveying passages can be simplified, and in particular, the height of the conveying passage structure can be lowered, wherein the degree of freedom of setting the upper surface height of the machine body 14 can be increased.

Also, the tip ends of bank notes in the taking-in direction, which is taken in the temporary storage portion 35 of deposited bank notes are stopped by either one of the stoppers 71*a* and 71*b* or front side wall 63 in response to the dimension in width of the bank notes which are taken in, the rear ends of bank notes in the taking-indirection are lined up, and are positioned in the temporary storage position where the taking-out thereof is made possible by the taking-in and taking-out means 66. And, since the stopping position of the tip ends of the bank notes is altered and adjusted by either one of the stoppers 71*a* and 71*b* or the front side wall 63 in response to the bank note width per denomination on the basis of identification of the denomination by the bank note identification portion 50, the rear ends of bank notes are lined up even if there are differences in the dimension in width in the conveying direction, depending on the denominations, for example, as in foreign bank notes, whereby the bank notes can be securely positioned at the temporary storage position where the taking-out is made possible by the taking-in and taking-out means 66, wherein it is possible to securely take out the temporarily stored bank notes by the taking-in and taking-out means 66.

In addition, the attaching position of the covering member 100 is not limited to the machine body 14. If it is attached to the lower structure unit 16, the lower structure unit 16 can be provided with a safety box feature. In a case where the covering member 100 is provided on the lower structure unit 16, the covering member 100 may be constructed so that it is opened and closed or detached and attached when the lower structure unit 16 is drawn out from the machine body 14. According to the first aspect of the invention, since the bank note depositing port and bank note dispensing port are, respectively, disposed on the upper side of the machine body, it becomes possible for a customer to observe or check the progressing state of a depositing process or dispensing process, wherein the customer is not provided with any sense of unease. Further, since the deposited bank notes are temporarily and collectively stored in the temporary storage portion of deposited bank notes, temporary storage of the deposited bank notes can be quickened, the temporary storage portion of deposited bank notes is disposed at the front side area of the machine body, and temporarily stored bank notes can be collectively taken out from the front side of the machine body by opening the front door of the temporary storage portion of deposited bank notes when the depositing is not approved, it becomes quick and easy to return the temporarily stored bank notes to a customer when the depositing is not approved by the customer, and the structure thereof can be simplified.

According to the second aspect of the invention, since the bank note depositing port and bank note dispensing port are, respectively, disposed on the upper side of the machine body, it becomes possible for a customer to observe or check the progressing state of a depositing process or dispensing process, wherein the customer is not provided any sense of unease. Further, since the deposited bank notes are temporarily and collectively stored in the temporary storage portion of deposited bank notes, temporary storage of the deposited bank notes can be quickened, the temporary storage portion of deposited bank notes is disposed at the front side area of the machine body, and temporarily stored bank notes can be collectively taken out from the front side of the machine body by opening the front door of the temporary storage portion of deposited bank notes when the depositing is not approved, it becomes quick and easy to return the temporarily stored bank notes to a customer when the depositing is not approved by the customer, and the structure thereof can be simplified. In addition, since the lower structure unit accommodated in the machine body is covered up by a covering member in a blocked state, it is not possible to take out bank notes from the denominated bank note storage portions of the lower structure unit even if the upper structure unit is drawn out, wherein it is possible to provide the lower structure unit including the denominated bank note storage portions with a safety box feature.

According to the third aspect of the invention, in addition to the effect of the circulating type bank note depositing and dispensing machine according to the second aspect, since the covering member is fixed on the machine body, it becomes possible to provide the lower structure unit with a safety box feature, for example, without employing a complicated structure by which the respective denominated bank note storage portion is made into a safety box structure, wherein bank note conveying portion of the lower structure unit, bank note receiving and taking-out portion per denominated bank note of the lower structure unit, and respective denominated bank note storage portions of the lower structure unit are automatically opened when drawing out the lower structure unit, and maintenance of the lower structure unit can be facilitated.

According to the fourth aspect of the invention, in addition to the effect of the second aspect or the third aspect, since bank note conveying portion of the upper structure unit, bank note conveying portion of the lower structure unit and the first connection passage are able to reverse the conveying direction of bank notes, the conveying passage structure can be simplified, particularly, the height of the conveying passage structure can be lowered, and the degree of freedom can be increased in setting the upper side height of the machine body.

According to the fifth aspect of the invention, in addition to the effect of any one of the first aspect through the fourth aspect, since the tip end engagement position of bank notes taken in the temporary storage portion of deposited bank notes is varied by any one of a plurality of engagement members in response to the dimension in width in the taking-in direction of the bank notes to be taken in, even bank notes whose dimensions in width in the taking-in direction differ per denomination, for example, like foreign bank notes can be securely positioned at the temporary storage position where bank notes can be taken out by the taking-in and taking-out means with the rear ends of the bank notes matched to each other regardless of differences in the width in the taking-in direction, and the temporarily stored bank notes can be securely taken out by the taking-in and taking-out means.

According to the sixth aspect of the invention, in addition to the effect of any one of the first aspect through the fifth aspect, since bank notes in the bank note depositing port and bank note dispensing port are visible from both the upward front side and upward rear side, it is possible to observe and check the progressing state of a depositing process or a dispensing process at both the teller side and the customer side.

According to the seventh aspect of the invention, in addition to the effect of any one of the first aspect through the sixth aspect, since bank notes are accommodated in an erect state in the bank note depositing port and bank note dispensing port, the bank note depositing state and dispensing state can be further easily observed by a customer in comparison to, for example, a case where bank notes are accumulated in the vertical direction in a horizontal state, wherein a sense of ease can be brought about to the customer. Further, the bank note dispensing port is provided with a transparent shutter that closes the bank note dispensing port during dispensing and opens the dispensing port when the dispensing is completed, and the bank notes in the bank note dispensing port are made visible through the transparent shutter from both upward front side and upward rear side. Therefore, it becomes possible to confirm the depositing and the dispensing state of bank notes, and the bank note depositing port can be clearly distinguished from the bank note dispensing port.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A circulating type bank note depositing and dispensing machine, in which deposited bank notes are used for dispensing bank notes, comprising:

an upper structure unit and a lower structure unit provided on a machine body configured so as to be drawable out from the front side of said machine body;

in said upper structure unit, a bank note dispensing portion through which bank notes are dispensed from a front side thereof and a bank note depositing portion into which bank notes are deposited disposed on the upper front side of said machine body; an occupancy instructing portion for instructing at which of a left or right side a process is taking place in an installation area of the bank note dispensing portion and bank note depositing portion; a temporary storage portion for collectively storing deposited bank notes disposed at the front side area of said machine body; a device which receives deposited bank notes sheet by sheet in the temporary storage portion and dispenses temporarily deposited bank notes sheet by sheet when a deposit is approved; an openable and closable front side door through which a customer of the circulating bank note depositing and dispensing machine can remove temporarily stored bank notes from the front side of said temporary storage portion if the deposit of the temporarily stored bank notes is not approved is disposed at the front side of the temporary storage portion; and an upper structure unit side bank note conveying portion which conveys bank notes by connecting the bank note dispensing portion, bank note depositing portion and temporary storage portion; a bank note identifying portion which identifies bank notes is disposed at bank note conveying portion of the upper structure unit;

in the lower structure unit, a reject box which accommodates rejected bank notes disposed at the front side area of said machine body; denominated bank note storage portions which accommodate bank notes per denomination disposed in front and rear directions in a rear area of said reject box; a bank note receiving and taking out portion which receives bank notes and dispenses the bank notes sheet by sheet disposed in respective denominated bank note storage portion portions; and a bank note conveying portion which conveys bank notes by connecting the bank note receiving and taking-out portions; and in said machine body or said lower structure unit, a covering member which covers up the lower structure unit when the lower structure unit accommodated in said machine body is closed, a first connection passage which connects bank note conveying portion of said upper structure unit and bank note conveying portion of said lower structure unit, and a second connection passage which connects bank note conveying portion of said upper structure unit and said reject box are respectively disposed; and a first opening for said first connection passage and a second opening for said second connection passage are provided in said covering member.

2. The circulating type bank note depositing and dispensing machine as set forth in claim 1, wherein said covering member is fixed on the machine body and is capable of opening the bank note conveying portion of said lower structure unit, said respective denominated bank note receiving and taking-out portion and respective denominated bank note storage portions when the lower structure unit is drawn out.

3. The circulating type bank note depositing and dispensing machine as set forth in claim 1 or 2, wherein said upper structure side bank note conveying portion, bank conveying portion of the lower structure unit and first connection passage are capable of reversing the conveying direction of bank notes.

4. The circulating type bank note depositing and dispensing machine as set forth in claim 3, wherein bank notes in the bank note depositing port and bank note dispensing port are visible from both the upward front side and the upward rear side.

5. The circulating type bank note depositing and dispensing machine as set forth in claim 3, wherein the bank note depositing port and bank note dispensing port accommodate bank notes in an upright position; and said bank note dispensing port includes a transparent shutter that is closed when dispensing bank notes and is opened after the dispensing is carried out, and the bank notes in said bank note dispensing port are visible from both the upward front side and the upward rear side.

6. The circulating type bank note depositing and dispensing machine as set forth in claim 1 or 2, wherein said temporary storage portion of deposited bank notes includes a plurality of engagement members which vary tip end engagement positions of bank notes taken in said temporary storage portion of deposited bank notes in response to the width in the taking-in direction of the bank notes and is capable of positioning the rear ends of bank notes at a temporary storage position which can be taken out by the-receiving and dispensing device with the rear ends thereof matched regardless of the width of the bank notes in said taking-in direction.

7. The circulating type bank note depositing and dispensing machine as set forth in claim 1 or 2, wherein bank notes in the bank note depositing port and bank note dispensing port are visible from both the upward front side and the upward rear side.

8. The circulating type bank note depositing and dispensing machine as set forth in claim 1 or 2, wherein the bank note depositing port and bank note dispensing port accommodate bank notes in an upright position; and said bank note dispensing port includes a transparent shutter that is closed when dispensing bank notes and is opened after the dispensing is carried out, and the bank notes in said bank note dispensing port are visible from both the upward front side and the upward rear side.

* * * * *